(12) United States Patent
Lee et al.

(10) Patent No.: US 11,309,139 B2
(45) Date of Patent: Apr. 19, 2022

(54) BIFACIAL LIGHT-HARVESTING DYE-SENSITIZED SOLAR CELL

(71) Applicant: NATIONAL CHENG KUNG UNIVERSITY, Tainan (TW)

(72) Inventors: Yuh-Lang Lee, Tainan (TW); I-Ping Liu, Tainan (TW); Yu-Syuan Cho, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 7 days.

(21) Appl. No.: 16/683,297

(22) Filed: Nov. 14, 2019

(65) Prior Publication Data

US 2021/0082633 A1 Mar. 18, 2021

(30) Foreign Application Priority Data

Sep. 16, 2019 (TW) .................................. 108133238

(51) Int. Cl.
*H01L 31/00* (2006.01)
*H01G 9/20* (2006.01)

(52) U.S. Cl.
CPC ........... *H01G 9/2059* (2013.01); *H01G 9/209* (2013.01); *H01G 9/2022* (2013.01)

(58) Field of Classification Search
CPC .................................................. H01G 9/2059
See application file for complete search history.

(56) References Cited

U.S. PATENT DOCUMENTS

| | | | |
|---|---|---|---|
| 2007/0209696 A1* | 9/2007 | Duerr ................... | H01G 9/2095 136/252 |
| 2010/0282313 A1 | 11/2010 | Chen et al. | |
| 2011/0155223 A1* | 6/2011 | Morooka ............. | H01G 9/2031 136/252 |
| 2014/0060637 A1* | 3/2014 | Hung .............. | H01L 31/022425 136/256 |

FOREIGN PATENT DOCUMENTS

| | | |
|---|---|---|
| TW | I475701 B | 3/2015 |
| TW | I635634 B | 9/2018 |

OTHER PUBLICATIONS

Liu, TW 201914070 English machine translation (Year: 2021).*
I-Ping Liu,Li-Wei Wang,Ming-Hsiang Tsai,Yun-Yu Chen,Hsisheng Teng, Yuh-Lang Lee, A new mechanism for interpreting the effect of TiO2 nanofillers in quasi-solid-state dye-sensitized solar cells.
Shanmuganathan Venkatesan,I-Ping Liu,Chiao-Wei Li, Chih-Mei Tseng-Shan, and Yuh-Lang Lee Quasi-Solid-State Dye-Sensitized Solar Cells for Efficient and Stable Power Generation under Room Light Conditions.

* cited by examiner

*Primary Examiner* — Angelo Trivisonno
(74) *Attorney, Agent, or Firm* — Mark M. Friedman

(57) ABSTRACT

A bifacial light-harvesting dye-sensitized solar cell is provided and has: a first transparent substrate, a second transparent substrate, a working electrode, a first semiconductor layer, a second semiconductor layer, a third semiconductor layer, a counter electrode, a light-transmitting catalyst layer, and a liquid electrolyte. A photoelectric conversion efficiency of the dye-sensitized solar cell is improved by using a specific working electrode structure.

2 Claims, 2 Drawing Sheets

BIFACIAL LIGHT-HARVESTING DYE-SENSITIZED SOLAR CELL

CROSS REFERENCE TO RELATED APPLICATION

This application claims priority to Taiwan Patent Application No. 108133238, filed on Sep. 16, 2019, which is incorporated herein by reference in its entirety.

FIELD OF DISCLOSURE

The present disclosure relates to solar cells, and more particularly to a bifacial light-harvesting dye-sensitized solar cell.

BACKGROUND OF DISCLOSURE

Solar cells have developed in recent decades and can be one of the main energy sources for replacing petroleum in the future. Current solar cells have many species of solar cells, such as single crystal silicon type, polycrystalline silicon type, thin film type, organic type, perovskite structural material type, or dye sensitized type.

Many studies have been directed to dye-sensitized solar cells. For example, an article published in the Journal of Power Sources in September 2019, entitled "A new Mechanism for interpreting the effect of $TiO_2$ nanofillers in quasi-solid-state dye-sensitized solar cells (Liu et al)". Or, in April 2019, an article published in the ACS Sustainable Chemistry and Engineering, titled "Quasi-Solid-State Dye-Sensitized Solar Cells for Efficient and Stable Power Generation under Room Light Conditions."

However, a photoelectric conversion efficiency of conventional solar cells is still significantly insufficient. Therefore, it is necessary to provide a bifacial light-harvesting dye-sensitized solar cell to solve problems existing in the conventional technologies.

SUMMARY OF DISCLOSURE

An object of the present disclosure is to provide a bifacial light-harvesting dye-sensitized solar cell, which mainly improves a photoelectric conversion efficiency of conventional solar cells by using a specific working electrode structure (including three semiconductor layers, wherein each of them has a specific thickness and a specific average particle diameter).

To achieve the above object, the present disclosure provides a bifacial light-harvesting dye-sensitized solar cell comprising: a first transparent substrate, a second transparent substrate, a working electrode, a first semiconductor layer, a second semiconductor layer, a third semiconductor layer, a counter electrode, a light-transmitting catalyst layer, and a liquid electrolyte. A receiving space is formed between the second transparent substrate and the first transparent substrate. The working electrode is disposed on the first transparent substrate and is located inside the receiving space. The first semiconductor layer is disposed on the working electrode and is located inside the receiving space, wherein the first semiconductor layer has a first thickness and comprises a plurality of first semiconductor particles, and the plurality of first semiconductor particles have a first average particle diameter. The second semiconductor layer is disposed on the first semiconductor layer and is located inside the receiving space, wherein the second semiconductor layer has a second thickness and comprises a plurality of second semiconductor particles, and the plurality of second semiconductor particles have a second average particle diameter, wherein the second average particle diameter is greater than the first average particle diameter. The third semiconductor layer is disposed on the second semiconductor layer and is located inside the receiving space, wherein the third semiconductor layer has a third thickness and comprises a plurality of third semiconductor particles, and the plurality of third semiconductor particles have a third average particle diameter, wherein the second average particle diameter is greater than the third average particle diameter, and the third thickness is identical to or greater than the first thickness. The counter electrode is disposed on the second transparent substrate and is located inside the receiving space. The light-transmitting catalyst layer is disposed on the counter electrode and is located inside the receiving space. The liquid electrolyte is filled in the receiving space.

In an embodiment of the present disclosure, the first average particle diameter is between 15 and 25 nm.

In an embodiment of the present disclosure, the second average particle diameter is between 350 and 450 nm.

In an embodiment of the present disclosure, the third average particle diameter is between 15 and 25 nm.

In an embodiment of the present disclosure, the first thickness is between 1 and 6 µm.

In an embodiment of the present disclosure, the second thickness is between 1 and 6 µm.

In an embodiment of the present disclosure, the third thickness is between 1 and 12 µm.

In an embodiment of the present disclosure, the third thickness is between 5 and 7 µm.

In an embodiment of the present disclosure, material of any one of the first semiconductor layer, the second semiconductor layer, and the third semiconductor layer comprises any one of titanium dioxide, tin dioxide, nickel oxide, and zinc oxide.

In an embodiment of the present disclosure, material of the light-transmitting catalyst layer comprises any one of platinum and poly-3,4-ethylenedioxythiophene.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

Figure 1:
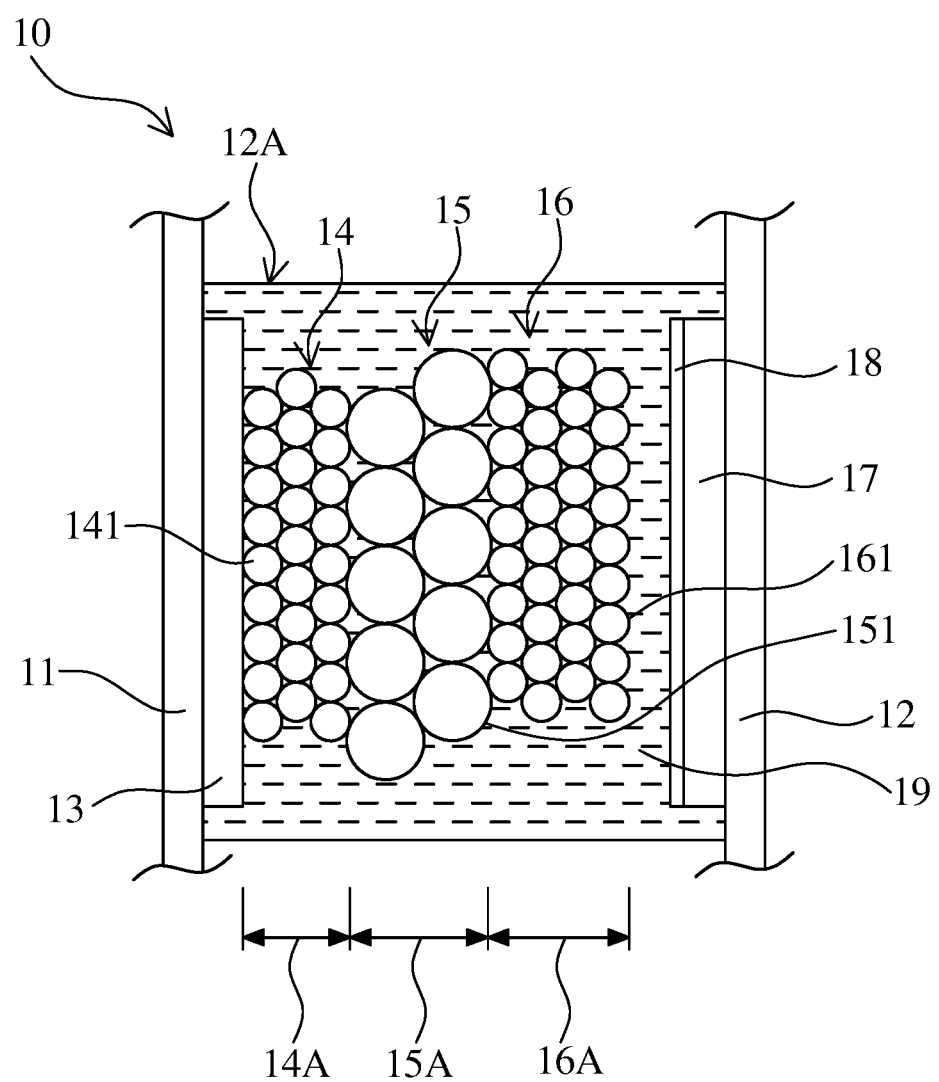
FIG. 1 is a schematic cross-sectional view showing a bifacial light-harvesting dye-sensitized solar cell according to an embodiment of the present disclosure.

Referring to FIG. 1, a bifacial light-harvesting dye-sensitized solar cell 10 in an embodiment of the present disclosure comprises: a first transparent substrate 11, a second transparent substrate 12, a working electrode 13, a first semiconductor layer 14, a second semiconductor layer 15, a third semiconductor layer 16, a counter electrode 17, a light-transmitting catalyst layer 18, and a liquid electrolyte 19. In an embodiment, the first transparent substrate 11 is, for example, a glass substrate or a plastic substrate. In an embodiment, the second transparent substrate 12 is, for example, a glass substrate or a plastic substrate. It is noted that the bifacial light-harvesting dye-sensitized solar cell 10 of an embodiment of the present disclosure is convert light into electric power, wherein the light is collected from the first transparent substrate 11 and the second transparent substrate 12, respectively. On the other hand, a receiving space 12A is formed between the second transparent substrate 12 and the first transparent substrate 11, and the receiving space 12A is mainly used to receive the working electrode 13, the first semiconductor layer 14, and the second semiconductor layer 15, the third semiconductor layer 16, the counter electrode 17, the light-transmitting catalyst layer 18, and the liquid electrolyte 19. In one embodiment, an adhesive agent (not shown) is disposed between the first transparent substrate 11 and the second transparent substrate 12, and the adhesive agent surrounds the receiving space 12A, so that the receiving space 12A is sealed.

In the bifacial light-harvesting dye-sensitized solar cell 10 according to an embodiment of the present disclosure, the working electrode 13 is disposed on the first transparent substrate 11 and is located inside the receiving space 12A. The working electrode 13 can be selected from various suitable light-transmitting conductive materials such as indium tin oxide (ITO) or fluorine-doped tin oxide (FTO).

In the bifacial light-harvesting dye-sensitized solar cell 10 according to an embodiment of the present disclosure, the first semiconductor layer 14 is disposed on the working electrode 13, wherein the first semiconductor layer 14 has a first thickness 14A and comprises a plurality of first semiconductor particles 141, and the plurality of first semiconductor particles 141 have a first average particle diameter. The first semiconductor layer 14 mainly serves as a light absorbing layer. In an embodiment, the first thickness is between 1 and 6 µm. In an example, the first thickness is such as 2, 3, 4, or 5 µm. In another embodiment, the first average particle diameter is between 15 and 25 nm. In an example, the first average particle diameter is, for example, 16, 18, 20, 21, 22, 23, or 24 nm. It is noted that the first semiconductor layer 14 is mainly composed of the first semiconductor particles 141 which are stacked, and may include various adjuvants (not shown) used to form the first semiconductor layer 14. For example, the first semiconductor layer 14 is formed on the first transparent substrate 11 by screen printing, and various adjuvants may be used in the process of performing the screen printing method. In still another embodiment, material of the first semiconductor layer 14 comprises any one of titanium dioxide, tin dioxide, nickel oxide, and zinc oxide.

The second semiconductor layer 15 is disposed on the first semiconductor layer 14, wherein the second semiconductor layer 15 has a second thickness 15A and comprises a plurality of second semiconductor particles 15, and the plurality of second semiconductor particles 151 have a second average particle diameter, wherein the second average particle diameter is greater than the first average particle diameter. It is noted that, since the second average particle diameter is greater than the first average particle diameter, the second semiconductor layer 15 is mainly used as a scattering layer of light, so that light that does not generate a photoelectric effect can be re-scattered back to the first semiconductor layer 14 (or the third semiconductor layer 16 described below). Therefore, the photoelectric conversion efficiency is further improved. In an embodiment, the second thickness is between 1 and 6 µm. In an example, the second thickness is such as 2, 3, 4, or 5 µm. In another embodiment, the second average particle diameter is between 350 and 450 nm. In an example, the second average particle diameter is, for example, 360, 380, 400, 410, 420, 430, or 440 nm. It is noted that the second semiconductor layer 15 is mainly composed of the second semiconductor particles 151 which are stacked, and may include various adjuvants (not shown) used to form the second semiconductor layer 15. For example, the second semiconductor layer 15 is formed on the first semiconductor layer 14 by screen printing, and various adjuvants may be used in the process of performing the screen printing method. In still another embodiment, material of the second semiconductor layer 15 comprises any one of titanium dioxide, tin dioxide, nickel oxide, and zinc oxide.

The third semiconductor layer 16 is disposed on the second semiconductor layer 15, wherein the third semiconductor layer 16 has a third thickness 16A and comprises a plurality of third semiconductor particles 161, and the plurality of third semiconductor particles 161 have a third average particle diameter, wherein the second average particle diameter is greater than the third average particle diameter. The third semiconductor layer 16 mainly serves as a light absorbing layer. In an embodiment, the third thickness is between 1 and 12 µm. In an example, the third thickness is such as 2, 3, 5, 7, 9, 10, or 11 µm. In another embodiment, the third thickness is between 5 and 7 µm. In another embodiment, the third average particle diameter is between 15 and 25 nm. In an example, the third average particle diameter is, for example, 16, 18, 20, 21, 22, 23, or 24 nm. It is noted that the third semiconductor layer 16 is mainly composed of the third semiconductor particles 161 which are stacked, and may include various adjuvants (not shown) used to form the third semiconductor layer 16. For example, the third semiconductor layer 16 is formed on the second semiconductor layer 15 by screen printing, and various adjuvants may be used in the process of performing the screen printing method. In still another embodiment, material of the third semiconductor layer 16 comprises any one of titanium dioxide, tin dioxide, nickel oxide, and zinc oxide.

In an embodiment, the first semiconductor layer 14, the second semiconductor layer 15, and the third semiconductor layer 16 are, for example, porous. Further, the first semiconductor layer 14, the second semiconductor layer 15, and the third semiconductor layer 16 may adsorb a photosensitizing dye.

In an embodiment, the second average particle diameter is significantly greater than the first average particle diameter and the third average particle diameter. For example, a value of the second average particle diameter is 15 to 27 times a value of the first average particle diameter, and the value of the second average particle diameter is 15 to 27 times a value of the third average particle diameter.

In the bifacial light-harvesting dye-sensitized solar cell 10 according to an embodiment of the present disclosure, the counter electrode 17 is disposed on the second transparent substrate 12 and is located inside the receiving space 12A. In an embodiment, the counter electrode 17 can be selected from various suitable light-transmitting conductive materials such as indium tin oxide (ITO) or fluorine-doped tin oxide (FTO).

In the bifacial light-harvesting dye-sensitized solar cell 10 according to an embodiment of the present disclosure, the liquid electrolyte 19 is filled in the receiving space 12A. In an embodiment, the liquid electrolyte 19 may use any liquid electrolyte known to be used in solar cells.

In an embodiment, the bifacial light-harvesting dye-sensitized solar cell 10 further comprises a light-transmitting catalyst layer 18 disposed on the counter electrode 17 and located inside the receiving space 12A. In an embodiment, material of the light-transmitting catalyst layer comprises any one of platinum and poly-3,4-ethylenedioxythiophene (PEDOT). In an example, a thickness of the light-transmitting catalyst layer is, for example, between 5 and 200 nm. It is noted that when platinum is used as the material of the light-transmitting catalyst layer, a thickness of the platinum needs to be permeable to light, for example, the thickness of platinum is between 5 and 15 nm.

It is noted that the bifacial light-harvesting dye-sensitized solar cell 10 according to an embodiment of the present disclosure has a feature of the working semiconductor layer 13 with at least three semiconductor layers (the first semiconductor layer 14, the second semiconductor layer 15, and the third semiconductor layer 16) to improve a photoelectric conversion efficiency of a conventional solar cell. More specifically, the first semiconductor layer 14 and the third semiconductor layer 16 are mainly used as a light absorbing layer, and two ways of lights incident from the first transparent substrate 11 and the second transparent substrate 12 are respectively absorbed. In addition, the second semiconductor layer 15 is mainly used as a scattering layer, and unabsorbed light can be scattered back into the first semiconductor layer 14 and the third semiconductor layer 16 to improve the photoelectric conversion efficiency.

Further, another feature of the bifacial light-harvesting dye-sensitized solar cell 10 of the embodiment of the present disclosure is that the third thickness of the third semiconductor layer 16 is between 5 and 7 μm, so as to further improve the photoelectric conversion efficiency.

Several embodiments and a comparative example are exemplified below to demonstrate that the bifacial light-harvesting dye-sensitized solar cell of the embodiment of the present disclosure can improve the photoelectric conversion efficiency.

Embodiment 1

Fluorine-doped tin oxide is formed on a first glass substrate to serve as a working electrode. Then, material of titanium dioxide is used as each of the semiconductor layers. A first semiconductor layer, a second semiconductor layer, and a third semiconductor layer are sequentially formed by screen printing, wherein the first semiconductor layer has a first thickness of about 2.73 μm. The first semiconductor layer includes a plurality of first semiconductor particles, and the first semiconductor particles have a first average particle diameter of about 20 nm. The second semiconductor layer has a second thickness of about 2.73 μm. The second semiconductor layer includes a plurality of second semiconductor particles, wherein the second semiconductor particles have a second average particle diameter of about 400 nm. The third semiconductor layer has a third thickness of about 2.73 μm. The third semiconductor layer includes a plurality of third semiconductor particles, and the third semiconductor particles have a third average particle diameter of about 20 nm.

Next, a photosensitive dye is adsorbed by the first semiconductor layer, the second semiconductor layer, and the third semiconductor layer. Then, fluorine-doped tin oxide is formed on a second glass substrate as a counter electrode. A light-transmitting platinum layer is formed on the counter electrode as a light-transmitting catalyst layer, and a liquid electrolyte is filled in a receiving space between the first glass substrate and the second glass substrate. A thickness of the light-transmitting platinum layer is about 10 nm. Finally, the receiving space is sealed to complete the bifacial light-harvesting dye-sensitized solar cell of Embodiment 1.

Embodiment 2

A fabricating method of Embodiment 2 is substantially similar to that of Embodiment 1, except that material of the light-transmitting catalyst layer of Embodiment 2 is made of poly-3,4-ethylenedioxythiophene (PEDOT). A thickness of the PEDOT catalyst layer is about 100 nm.

Embodiments 3 and 4

Fabricating methods of Embodiments 3 and 4 are substantially similar to that of Embodiment 1, except that Embodiments 3 and 4 form third semiconductor layers having different thicknesses (6.51 μm and 9.5 μm) by screen printing twice and three times, respectively.

Comparative Example 1

A fabricating method of Comparative example 1 is substantially similar to that of Embodiment 1, except that Comparative example 1 does not include a third semiconductor layer.

Then, Embodiments 1 and 2 and Comparative Example 1 are analyzed and compared by using commercially available instruments, and are measured by using light incident from a front surface of the solar cell (injected from the first transparent substrate 11) and from a back surface of the solar cell (injected from the second transparent substrate 12) under standard sunlight of an air mass (AM) 1.5 G spectrum, respectively. Results are shown in Table 1 below.

TABLE 1

|  | thickness of 3rd semiconductor (μm) | counter electrode | light incident | short-circuit current density $J_{sc}$ (mA cm$^{-2}$) | open circuit voltage Voc (V) | fill factor FF | conversion efficiency η (%) |
| --- | --- | --- | --- | --- | --- | --- | --- |
| Embodiment 1 | 2.73 | platinum | front | 11.25 | 0.864 | 0.705 | 6.85 |
|  |  |  | back | 5.83 | 0.864 | 0.737 | 3.71 |
| Embodiment 2 | 2.73 | PEDOT | front | 11.41 | 0.862 | 0.718 | 7.07 |
|  |  |  | back | 7.41 | 0.864 | 0.752 | 4.81 |
| Embodiment 3 | 6.51 | platinum | front | 10.87 | 0.845 | 0.686 | 6.30 |
|  |  |  | back | 6.27 | 0.846 | 0.710 | 3.77 |

TABLE 1-continued

| | thickness of 3rd semiconductor (μm) | counter electrode | light incident | short-circuit current density $J_{sc}$ (mA cm$^{-2}$) | open circuit voltage Voc (V) | fill factor FF | conversion efficiency η (%) |
|---|---|---|---|---|---|---|---|
| Embodiment 4 | 9.50 | platinum | front | 11.41 | 0.812 | 0.559 | 5.18 |
| | | | back | 6.43 | 0.827 | 0.622 | 3.31 |
| Comparative Example 1 | N/A | platinum | front | 11.05 | 0.875 | 0.699 | 6.76 |
| | | | back | 4.73 | 0.862 | 0.714 | 2.91 |

Figure 2:
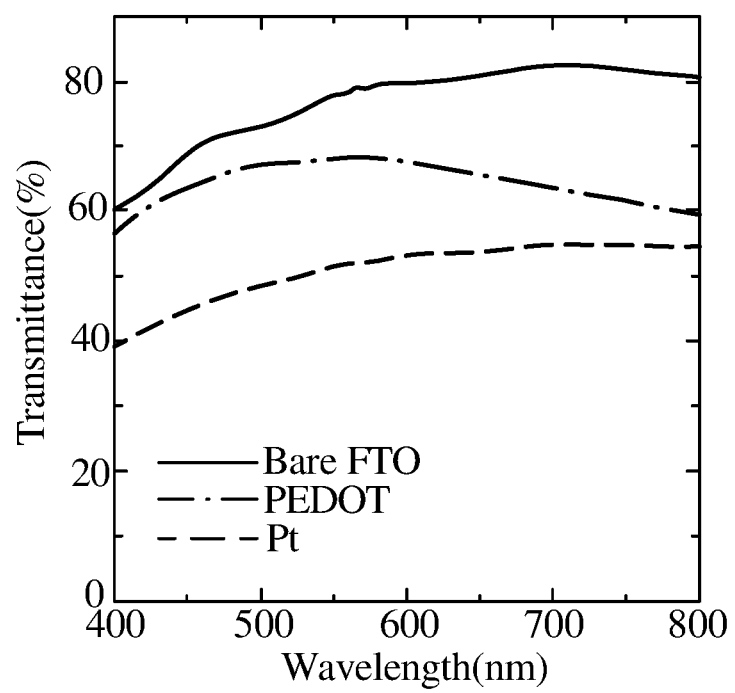
FIG. 2 is a graph showing results of transmittance analysis of the second transparent substrate under different conditions.

As seen in table 1, by using a three-layer semiconductor structure, the conversion efficiency of the solar cell in the light incident direction of the back surface can be improved. In addition, if PEDOT is used as a catalyst material of the counter electrode, the conversion efficiency of the solar cell in the light incident direction of the back surface can be further improved. This is because PEDOT not only has catalytic properties for liquid electrolytes, but also has extremely high transmittance. Referring to FIG. 2, FIG. 2 is a diagram showing results of transmittance analysis of the counter electrode. Bare FTO refers to FTO (i.e., FTO substrate) being disposed on the second transparent substrate. PEDOT in FIG. 2 refers to a counter electrode having a catalytic material of PEDOT is provided on the FTO substrate (i.e., Embodiment 2). Pt in FIG. 2 is a counter electrode provided with a catalyst material of platinum on the FTO substrate (i.e., Embodiment 1). As can be seen from FIG. 2, the counter electrode of PEDOT has a higher transmittance than the counter electrode of platinum.

Further, according to Embodiments 1, 3, and 4 and Comparative example 1, the third semiconductor layer can be used to increase the conversion efficiency of the back surface of the solar cell. On the other hand, from Embodiments 1, 3, and 4, when the third thickness is between 5 and 7 μm, the back surface of the solar cell has the highest conversion efficiency. In general, the smaller the thickness of the light absorbing layer usually located on the front side, the better the conversion efficiency. However, from Embodiment 3, the thickness (third thickness) of the light absorbing layer of the back side needs to be in a specific range so as to have a preferable conversion efficiency The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A bifacial light-harvesting dye-sensitized solar cell, comprising:
a first transparent substrate;
a second transparent substrate, wherein a receiving space is formed between the second transparent substrate and the first transparent substrate;
a working electrode disposed on the first transparent substrate and located inside the receiving space;
exactly three semiconductor layers consisting of a first semiconductor layer, a second semiconductor layer, and a third semiconductor layer, wherein:
the first semiconductor layer is disposed on the working electrode and located inside the receiving space, wherein the first semiconductor layer has a first thickness and comprises a plurality of first semiconductor particles, and the plurality of first semiconductor particles have a first average particle diameter, wherein the first average particle diameter is between 21 and 25 nm, and the first thickness is between 1 and 2.73 μm;
the second semiconductor layer is disposed on the first semiconductor layer and located inside the receiving space, wherein the second semiconductor layer has a second thickness and comprises a plurality of second semiconductor particles, and the plurality of second semiconductor particles have a second average particle diameter, wherein the second average particle diameter is between 410 and 450 nm, and the second thickness is between 1 and 2.73 μm; and
the third semiconductor layer is disposed on the second semiconductor layer and located inside the receiving space, wherein the third semiconductor layer has a third thickness and comprises a plurality of third semiconductor particles, and the plurality of third semiconductor particles have a third average particle diameter, wherein the third average particle diameter is between 15 and 18 nm, wherein the third thickness is between 6.51 and 7 μm;
a counter electrode disposed on the second transparent substrate and located inside the receiving space;
a light-transmitting catalyst layer disposed on the counter electrode and located inside the receiving space, wherein material of the light-transmitting catalyst layer comprises platinum, and a thickness of the light-transmitting catalyst layer is between 5 and 15 nm; and
a liquid electrolyte filled in the receiving space.

2. The bifacial light-harvesting dye-sensitized solar cell according to claim 1, wherein material of any one of the first semiconductor layer, the second semiconductor layer, and the third semiconductor layer comprises any one of titanium dioxide, tin dioxide, nickel oxide, and zinc oxide.

* * * * *